C. J. WIDMER.
COMBINED FRICTION AND JAW CLUTCH.
APPLICATION FILED MAY 18, 1908.
905,260.
Patented Dec. 1, 1908.
2 SHEETS—SHEET 1.
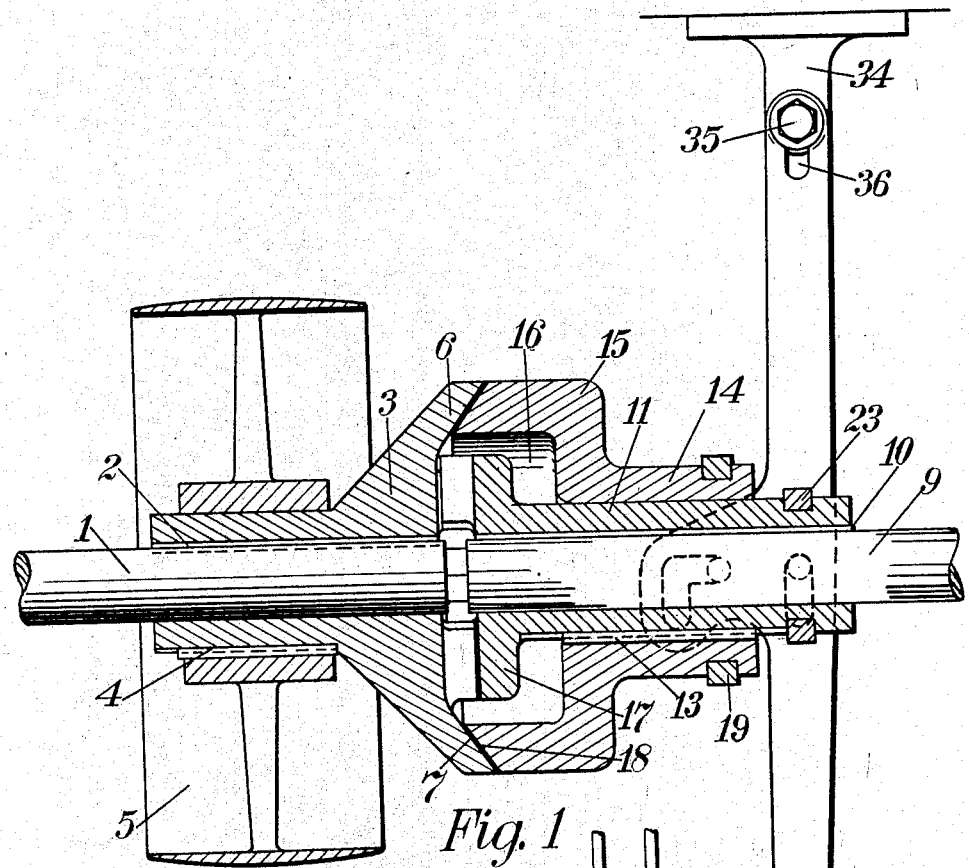
Fig. 1
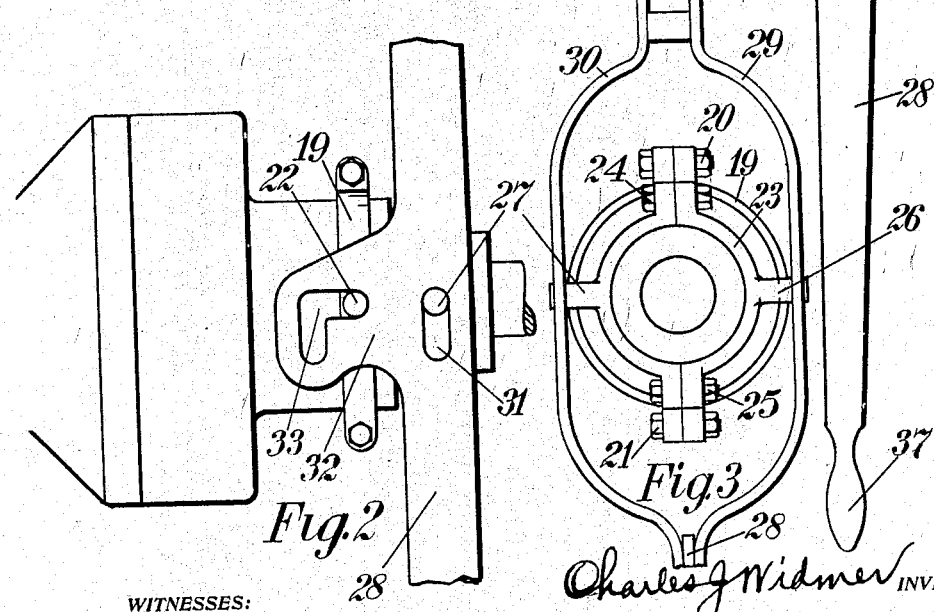
Fig. 2
Fig. 3
WITNESSES:
A. Rager.
Roy Brumholt
Charles J. Widmer INVENTOR
BY
Geo. W. Rightmire
ATTORNEY

C. J. WIDMER.
COMBINED FRICTION AND JAW CLUTCH.
APPLICATION FILED MAY 18, 1908.

905,260.

Patented Dec. 1, 1908.
2 SHEETS—SHEET 2.

WITNESSES:

Charles J Widmer
INVENTOR

BY
Geo. W. Rightmire
ATTORNEY

UNITED STATES PATENT OFFICE.

CHARLES J. WIDMER, OF SIDNEY, OHIO, ASSIGNOR TO THE PHILIP SMITH MANUFACTURING COMPANY, OF SIDNEY, OHIO, A CORPORATION OF OHIO.

COMBINED FRICTION AND JAW CLUTCH.

No. 905,260.  Specification of Letters Patent.  Patented Dec. 1, 1908.

Application filed May 18, 1908. Serial No. 433,573.

*To all whom it may concern:*

Be it known that I, CHARLES J. WIDMER, a citizen of the United States, residing at Sidney, in the county of Shelby and State of Ohio, have invented certain new and useful Improvements in a Combined Friction and Jaw Clutch, of which the following is a specification.

My invention relates to improvements in a combined friction and jaw clutch, which is so constructed that the friction clutch is utilized in transmitting the desired speed to the driven shaft, whereupon the jaw clutch may be brought into operation during the rotation of the shaft; in a similar manner, the jaw clutch may be thrown out of operation during the rotation of the shaft, leaving the engagement to be effected by the friction clutch, whereupon the friction clutch may also be thrown out of operation and the transmission of power terminated for that occasion.

It consists further in means for appropriately mounting the friction clutch and the jaw clutch so that both may be operated through one lever, the construction being such that the lever may be manipulated to accomplish this result.

It consists further in various constructions mentioned and their combinations to form a combined friction and jaw clutch which is simple in its construction and operation and readily manipulated.

Figure 4:
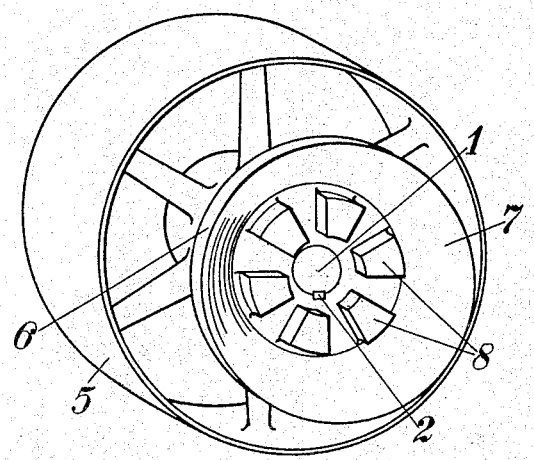
Figure 5:
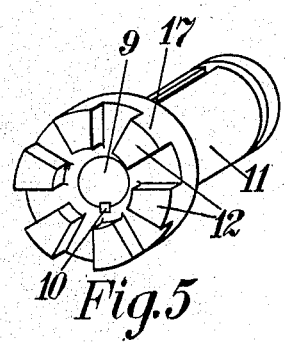
Figure 6:
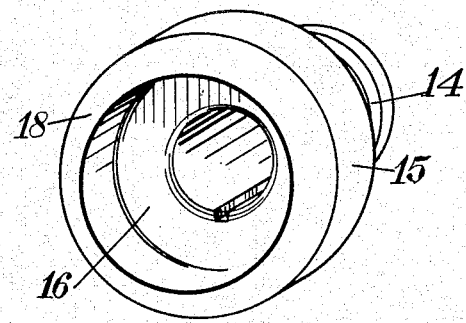

Referring to the drawings which are hereto attached and hereby made a part of this specification, Figure 1 is a longitudinal vertical section through my improved clutch construction, the parts being in place; Fig. 2 is a side view of the manipulating lever mounted upon the clutch construction; Fig. 3 is a view showing the manner of mounting the operating construction for the sliding clutch members; Fig. 4 is a perspective of the portion of the clutch fixed to the driving shaft showing the pulley in place thereon; Fig. 5 is a perspective of the portion of the jaw clutch mounted upon the driven shaft; Fig. 6 is a perspective of the portion of the friction clutch which is mounted upon the driven shaft.

In the drawings in which the same numeral indicates the same part throughout, 1 is the shaft from which the power is to be taken, which may here be called the driving shaft, having mounted thereon with the usual spline or key construction 2 the fixed clutch member 3, and splined upon this fixed clutch member at 4 is a pulley 5, which is adapted to be connected by a belt in the usual way to the engine or to another shaft. The fixed clutch member 3 has a bell shape at its outer end as shown at 6, and the inner face 7 of this bell shaped portion 6 is formed for the purpose of frictionally engaging the beveled face, hereafter described, on the sliding clutch member; the fixed clutch member also has mounted therein the teeth 8 appropriately spaced and shaped to form a jaw clutch member.

The shaft to be driven is indicated at 9, and it has mounted thereon and secured in place by the spline 10 the sliding jaw clutch member 11, having at its inner end the teeth 12 approximately formed and placed to slide into engagement with the teeth 8 above described on the fixed clutch member. Mounted upon the sliding jaw clutch member 11 and secured thereon by the spline 13 is the sliding friction clutch member 14, having its inner end 15 enlarged and bored out to form the circular recess 16, which is adapted to receive the head 17 of the sliding jaw clutch member, and to afford space for the reciprocation therein of said sliding jaw clutch member. The end of the enlarged portion 15 is formed with the beveled face 18 circumferentially thereof, being appropriately beveled to engage the face 7 of the fixed friction clutch member, and when these faces 7 and 18 are brought into engagement, through friction, the fixed clutch member will drive the sliding clutch member 14, thereby driving the shaft 9. Also, when the jaw clutch members are brought into engagement, the shaft 1 operates to drive the shaft 9.

Mounted upon the sliding friction clutch member 14 is the divided collar 19 secured by the bolts 20, 21, each portion of said collar having projecting therefrom a pin as shown at 22. A second divided collar 23 is mounted upon the sliding jaw clutch member 11 and the parts thereof are secured together by the bolts 24 and 25; projecting from the collar 23 are the pins 26 and 27.

The controlling lever 28 is formed with the branches 29 and 30 which receive the pins 26 and 27 through the slotted openings, one being shown at 31; said lever 28 has an extension 32 formed thereon slotted at 33 for the reception of pin 22 on the collar 19. The slot 33 is seen to be angular, whereas the slot 31 is seen to be formed longitudinally of the lever 28. The controlling lever 28 is pivoted at its upper end to the bracket 34 by means of the bolt 35 passing through the slotted opening 36; an appropriate handhold 37 is formed at the lower end of the lever.

When the pin 22 is positioned in the vertical portion of the slot 33, the lever 28 is free to be moved upwardly and downwardly, inasmuch as the pins 22 and 27 and the pivot bolt 35 admit of a sliding movement thereon, the extent of which is determined by the length of the slots; it is also seen that when the transverse portion of the slot 33 receives the pin 22, the controlling lever may be moved laterally, that is, longitudinally of the shaft, without disturbing the position of the collar 19, and consequently without moving the slidable friction clutch member 14.

The construction just described is formed for the purpose of permitting the manipulation of the sliding friction clutch member 14 and the sliding jaw clutch member 11 independently of each other, this being effected as follows, to wit: Suppose the lever to be positioned as shown in Fig. 2, which is the position shown in Fig. 1, in section; if the lever be pulled outwardly, the engagement of the pin 27 with the lever in the slotted opening 31, will slide the jaw clutch member 11 outwardly away from engagement with the fixed jaw clutch member 3, without disturbing the position of the friction clutch member 14; the transverse portion of the slot 33 is of such a length as to permit the movement outwardly of the lever sufficiently to disengage the teeth 12 from the teeth 8, whereupon the driving is effected entirely through the friction clutch members. If the outward movement of the controlling lever 28 be continued, the engagement of the pin 22 and the vertical wall of the slot 33 will cause the friction clutch member 14 to be moved along the shaft, thereby disengaging the faces 7 and 18, whereupon the shaft 9 will come to rest. To bring the clutches into engagement, the lever 28 is moved upwardly, which is permitted by the slots mentioned, until the vertical portion of the slot 33 receives the pin 22, whereupon the lever 28 may be moved inwardly along the shaft, whereby the friction clutch member 14 is moved inwardly upon the jaw clutch member 11 without disturbing the position of the latter. Frictional engagement is thereby effected between the faces 18 and 7, whereby the shaft 9 is given the speed of shaft 1. When this has taken place, the lever 28 is drawn downwardly until the transverse portion of the slot 33 receives the pin 22, whereupon the lever may be pushed inwardly again; the effect of this inward movement now is to slide the jaw clutch member 11 along the shaft, into engagement with the fixed jaw clutch member, this engagement being effected without difficulty for the reason that the shafts 1 and 9 are rotating in unison. A positive clutch is in this manner effected, whereupon the friction clutch member may be thrown out of engagement in the manner described above.

By the use of the construction described it is seen that thereby shaft members may be clutched together while they are running at full speed, the transmission having been effected by the friction clutch construction described; also the disengagement of the jaw clutch may be effected while the shafts are running at full speed, by engaging the friction clutches for taking up the transmission, whereupon the jaw clutches may be readily disengaged; when this has been done, the friction clutches may be disengaged, whereupon the driven shaft will come to rest.

I have provided a combined friction and jaw clutch which is simple in its construction, readily attached to any shaft or detached therefrom, easily manipulated, whereby a positive clutching may be effected or terminated without danger of stripping the teeth or mutilating the clutches, while the shafts are in full speed, the transmission being effected during the manipulation of the jaw clutch, by the friction clutch construction described. The friction faces are beveled and the engagement takes place throughout a comparatively large circle and over a comparatively wide surface; therefore, the wear produced on the friction faces is very slight, and on account of the great friction area, the drive is surely and easily effected. This construction renders the life of the friction clutch of great duration.

I desire to claim all modifications of the construction herein shown and described which are within the spirit of my invention.

What I claim is:

1. A combined friction and jaw clutch mounted upon a driven shaft comprising a jaw clutch member mounted for reciprocation, a friction clutch member mounted upon said jaw clutch member for reciprocation and having an enlarged recessed end in which said jaw clutch member may be reciprocated, a collar loosely mounted on each of said clutch members, a single controlling lever constructed to engage said collars in such manner that said clutch members may be manipulated in unison or independently of each other.

2. A combined friction and jaw clutch mounted upon a driven shaft comprising a jaw clutch member mounted for reciprocation, a friction clutch member mounted upon said jaw clutch member for reciprocation and having an enlarged recessed end in which said jaw clutch member may be reciprocated, a collar loosely mounted on each of said clutch members, pins on said collars, a single controlling lever pivoted for longitudinal reciprocation and having slots for the reception of said pins, whereby said clutch members may be moved in unison or independently of each other, as desired.

3. A combined jaw and friction clutch construction mounted upon a driven shaft and comprising a slidable jaw clutch member, a slidable friction clutch member mounted thereon and containing a recessed head in which said jaw clutch member may be reciprocated, a collar loosely mounted upon each of said clutch members, pins on said collars, a controlling lever slotted at one end longitudinally to receive its pivot, and at another point slotted longitudinally to receive the pins on said jaw clutch member, and having an angular slot formed therein for receiving the pins on said friction clutch member, whereby through the actuation of said lever said clutch members may be manipulated either in unison or independently of each other as desired.

4. In a combined friction and jaw clutch arranged telescopically, a pin member on each of said clutch members, a lever provided with means for engaging said pin members and adapted for being positioned thereon to move said clutch members in unison or singly as desired.

In testimony whereof I affix my signature in the presence of two witnesses.

CHARLES J. WIDMER.

Witnesses:
ANDREW J. HESS,
B. D. HECK.